US009662855B2

(12) United States Patent
Pfaffelhuber et al.

(10) Patent No.: US 9,662,855 B2
(45) Date of Patent: May 30, 2017

(54) MULTI-LAYERED STRUCTURAL COMPONENT

(71) Applicant: Röchling Automotive SE & Co. KG, Mannheim (DE)

(72) Inventors: Klaus Pfaffelhuber, Augsburg (DE); Christian Arlt, Ilvesheim (DE)

(73) Assignee: RÖCHLING AUTOMOTIVE SE & CO. KG, Mannheim (DE)

( * ) Notice: Subject to any disclaimer, the term of this patent is extended or adjusted under 35 U.S.C. 154(b) by 66 days.

(21) Appl. No.: 14/245,255

(22) Filed: Apr. 4, 2014

(65) Prior Publication Data

US 2014/0302279 A1    Oct. 9, 2014

(30) Foreign Application Priority Data

Apr. 5, 2013  (DE) .................. 10 2013 206 086

(51) Int. Cl.
*B32B 3/26* (2006.01)
*B32B 15/14* (2006.01)
(Continued)

(52) U.S. Cl.
CPC .............. *B32B 3/26* (2013.01); *B32B 3/263* (2013.01); *B32B 3/266* (2013.01); *B32B 3/28* (2013.01);
(Continued)

(58) Field of Classification Search
CPC .............. B32B 15/14; B32B 2250/42; B32B 2307/102; B32B 2471/00; B32B 2605/00;
(Continued)

(56) References Cited

U.S. PATENT DOCUMENTS 3,558,350 A * 1/1971 Fincke .................. C08J 5/044
264/DIG. 19
3,970,136 A * 7/1976 Cannell .................. B22D 19/14
164/108
(Continued)

FOREIGN PATENT DOCUMENTS

CN        102514290 A  *  6/2012
DE        19513949 A1     10/1995
(Continued)

OTHER PUBLICATIONS

Search Report received in corresponding German application 10 2013 206 086.6, Jun. 18, 2013.
DIN EN 310; Aug. 1993; 5 pages.

*Primary Examiner* — Philip Tucker
*Assistant Examiner* — Vicki Wu
(74) *Attorney, Agent, or Firm* — Rothwell, Figg, Ernst & Manbeck, P.C.

(57) ABSTRACT

The present invention relates to a multi-layered structural component (10), in particular for a motor vehicle, preferably a floor component for a motor vehicle, comprising at least two fiber layers (14) which each include a fiber material and a thermoplastic binder and are arranged one above the other in a stacking direction (S), and at least one metal layer (12) having a thickness (d) of at most 1 mm which is arranged between the two fiber layers (14), wherein the fiber layers (14) each have, at least in certain regions, a porosity of at least 75%, and wherein the structural component (10) comprises at least three metal layers (12) which are arranged one above the other in a stacking direction (S) and each have a thickness (d) of at most 1 mm, with each of the two fiber layers (14) being arranged between two metal layers (12) that are adjacent to one another in the stacking direction (S).

13 Claims, 1 Drawing Sheet

(51) Int. Cl.
*B32B 3/28* (2006.01)
*B62D 29/04* (2006.01)

(52) U.S. Cl.
CPC ............ *B32B 15/14* (2013.01); *B62D 29/043* (2013.01); *B32B 2250/42* (2013.01); *B32B 2307/102* (2013.01); *B32B 2471/00* (2013.01); *B32B 2605/00* (2013.01); *Y10T 156/1002* (2015.01); *Y10T 428/24331* (2015.01); *Y10T 428/24496* (2015.01); *Y10T 428/24917* (2015.01); *Y10T 428/249981* (2015.04)

(58) Field of Classification Search
CPC  B32B 3/26; B32B 3/263; B32B 3/266; B32B 3/28; Y10T 428/24331; Y10T 428/24917; Y10T 156/1002; Y10T 428/24496; Y20T 428/249981; B62D 29/043
USPC ........................................................ 156/245
See application file for complete search history.

(56) References Cited

U.S. PATENT DOCUMENTS

| | | | | |
|---|---|---|---|---|
| 4,061,815 A * | 12/1977 | Poole, Jr. | ........... | B32B 27/12 428/215 |
| 4,078,124 A * | 3/1978 | Prentice | ............. | B32B 5/26 156/290 |
| 4,836,084 A * | 6/1989 | Vogelesang | ......... | F41H 5/0414 109/82 |
| 4,902,364 A * | 2/1990 | Parker | ................ | B41M 3/12 156/233 |
| 4,992,323 A * | 2/1991 | Vogelesang | ............ | B32B 15/08 428/215 |
| 5,202,174 A * | 4/1993 | Capaul | .................. | B32B 13/02 156/291 |
| 5,288,843 A * | 2/1994 | Tamai | ............... | C08G 73/1042 528/125 |
| 5,464,952 A | 11/1995 | Shah et al. | | |
| 5,480,706 A * | 1/1996 | Li | .................... | B29C 70/08 428/113 |
| 5,609,652 A | 3/1997 | Yamada et al. | | |
| 5,814,137 A * | 9/1998 | Blohowiak | ........... | C09D 5/086 106/14.13 |
| 5,820,244 A | 10/1998 | Yamada et al. | | |
| 5,851,647 A * | 12/1998 | Foster | ................ | C03C 29/00 428/198 |
| 5,866,272 A * | 2/1999 | Westre | ................ | B32B 3/12 244/119 |
| 6,378,208 B1 | 4/2002 | Kölbl et al. | | |
| 6,499,797 B1 | 12/2002 | Böhm et al. | | |
| 6,521,331 B1 * | 2/2003 | Sikorski | ............... | B29C 70/885 264/332 |
| 6,869,894 B2 * | 3/2005 | Moore | .................. | C09J 193/04 156/331.7 |
| 7,784,856 B2 | 8/2010 | Fuchs et al. | | |
| 2003/0118806 A1 | 6/2003 | Schonebeck | | |
| 2006/0019099 A1 * | 1/2006 | Wang | ............... | B29C 45/14811 428/412 |
| 2006/0244170 A1 * | 11/2006 | Brentrup | ............. | B29C 70/506 264/122 |
| 2007/0160864 A1 | 7/2007 | DeCiutiis et al. | | |
| 2008/0073146 A1 | 3/2008 | Thompson, Jr. et al. | | |
| 2008/0176036 A1 * | 7/2008 | Mitchell | ............... | B32B 3/10 428/136 |
| 2008/0179448 A1 * | 7/2008 | Layland | ................. | B64D 15/12 244/1 N |
| 2009/0179461 A1 | 7/2009 | Fuchs et al. | | |
| 2009/0202840 A1 | 8/2009 | Griebel et al. | | |
| 2009/0282949 A1 * | 11/2009 | Seals | .................... | B23K 35/325 75/302 |
| 2014/0233781 A1 * | 8/2014 | Kawakami | ............. | D04H 1/46 381/359 |

FOREIGN PATENT DOCUMENTS

| | | |
|---|---|---|
| DE | 19956930 A1 | 5/2001 |
| DE | 202004004366 U1 | 8/2004 |
| DE | 1020060025745 A1 | 12/2007 |
| DE | 102006050144 A1 | 4/2008 |
| DE | 102007009928 A1 | 7/2008 |
| DE | 102010011914 A1 | 10/2010 |
| DE | 102011109471 A1 | 3/2012 |
| EP | 0995667 A1 | 4/2000 |
| EP | 1101590 A1 | 5/2001 |
| WO | 2008089873 A2 | 7/2008 |
| WO | 2010107766 A1 | 9/2010 |

* cited by examiner

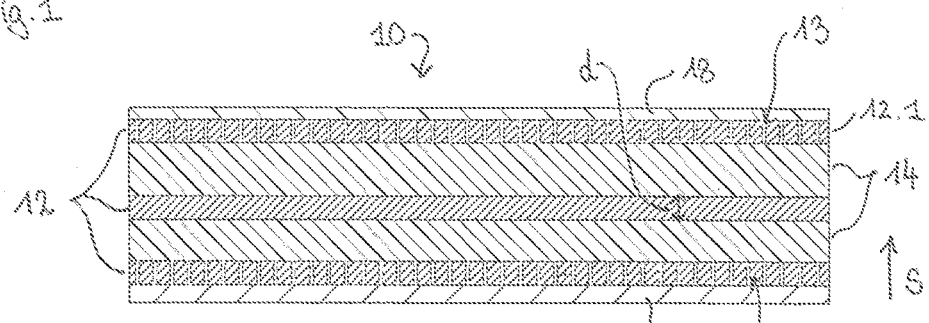
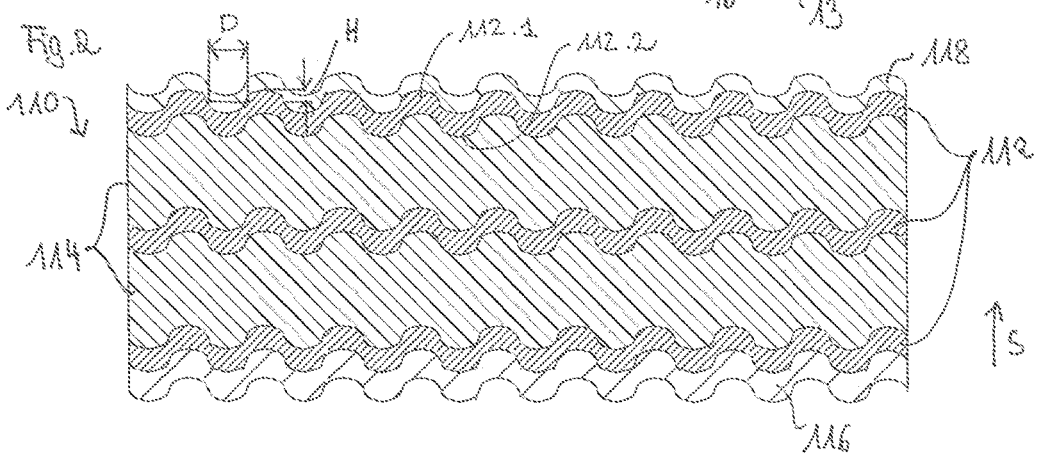
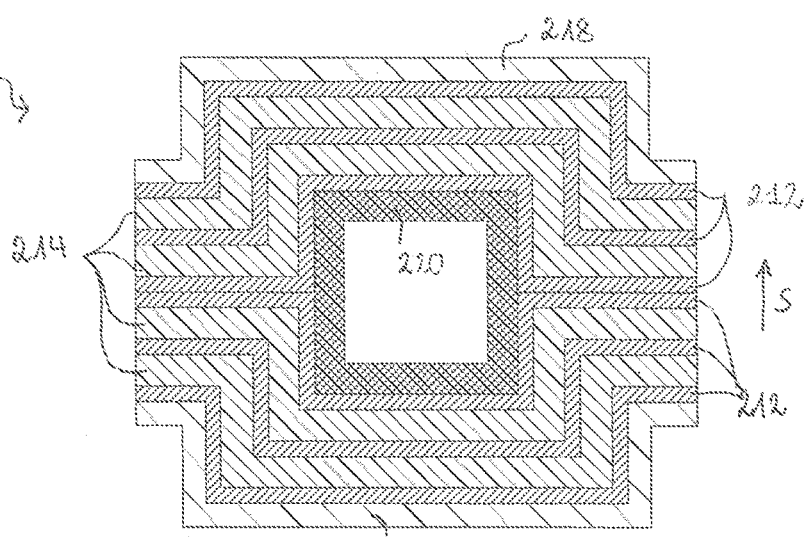

MULTI-LAYERED STRUCTURAL COMPONENT

CROSS REFERENCE TO RELATED APPLICATION(S)

This application claims priority to German Application No, 10 2013 206 086.6, filed Apr. 5, 2013. The disclosure for the above-referenced application is incorporated herein in its entirety by reference.

The present application relates to a multi-layered structural component, in particular for a motor vehicle, preferably a floor component for a motor vehicle, comprising at least two fibre layers which each include a fibre material and a thermoplastic binder and are arranged one above the other in a stacking direction, and at least one metal layer having a thickness of at most 1 millimeters which is arranged between the two fibre layers.

A structural component of this kind in the form of a floor pan for a motor vehicle which is constructed in multiple layers is known from printed specification U.S. Pat. No. 7,784,856 B2. In this known floor pan, an individual metal grid is arranged between two glass fibre layers.

Plastics/metal hybrid components of this kind are very advantageous for automotive construction in particular, since they combine low weight with high loading capacity. However, the potential for performance and for use is not yet exploited to the full in that instance.

For this reason, given the background of the prior art mentioned above, the object of the present invention is to improve the known structural component such that the ratio between flexural rigidity and weight is increased.

According to the invention, this object is achieved in that the fibre layers each have, at least in certain regions, a porosity of at least 75%, and in that the structural component comprises at least three metal layers which are arranged one above the other in a stacking direction and each have a thickness of at most 1 millimeters, with each of the two fibre layers being arranged between two metal layers that are adjacent to one another in the stacking direction.

As a result of a multi-layered construction of this kind and the use of a porous fibre material, by comparison with the known component the weight may be further reduced while maintaining approximately the same flexural rigidity, or the flexural rigidity may be increased while maintaining approximately the same weight.

A comparison of the flexural rigidity of any two bodies having approximately the same dimensions may be performed by a comparative bending test (such as a three-point bending test in the same bending test device and with the same boundary conditions). In the case of plate-like, in particular planar plate-like bodies, the bending axis is preferably in the plane of the plate, and preferably runs parallel to an edge of a rectangular or square plate-like body. In particular, the flexural rigidity may be calculated as the product of the modulus of elasticity and the second moment of area (moment of inertia of plane area) of a body to be tested, wherein the modulus of elasticity may be determined for example using the standard DIN EN 310 (as at August 1993) or another suitable method.

Up until now, moreover, it has still been very common to use a solid metal sheet (having a weight per unit area of more than 5 kg/m$^2$) as the floor pan in motor vehicles, and this has to be provided subsequently with a plurality of functional layers for the purpose of sound absorption, noise reduction, or for the purpose of improving comfort and visual appearance, and so is both heavy and also complicated to manufacture. In the case of the structural component according to the invention, by contrast, the weight may be significantly reduced and the different functional layers may already be integrated in the component, which makes manufacture and assembly significantly simpler.

Where the present application refers to two layers as being connected or adjacent to one another, this should in all cases be understood both as a direct and as an indirect connection or adjacency (that is to say a connection or adjacency with at least one other layer or other element arranged in between). The same applies if a layer is referred to as being arranged between two other layers.

Furthermore, the term "porosity" of a material is to be understood as the ratio of the volume of cavities to the total volume of the material.

The metal layers may in particular be in the form of metal sheets or metal foils and/or may in particular each have a thickness of at most 0.75 millimeters, preferably at most 0.5 millimeters. Thicknesses of at most 0.3 millimeters are also possible.

For reasons of sound absorption and weight, it is preferable if at least one fibre layer has, at least in certain regions, preferably predominantly or entirely, a porosity of between 85% and 95%, with preferably a plurality or all of the fibre layers having the above-mentioned porosity at least in certain regions.

For at least one fibre layer, preferably a plurality or all of the fibre layers, a binder content of approximately 50 to 70 mass percent and a fibre content of approximately 30 to 50 mass percent has proved advantageous in order to achieve sufficient strength in the fibre layer.

Conventionally, as will be described in more detail below, structural components of this kind are manufactured by stacking the various layers one above the other and by compressing and where necessary shaping them under the action of pressure and where necessary heat, to produce the structural component.

During the compression, the structural component may be compacted in certain regions, and in this case the porosity of the fibre layers in the compacted or partially compacted regions may also be less than 75 percent provided the fibre layers in the structural component have, at least in certain regions, preferably predominantly, a porosity of at least 75 percent.

For example, in the case of a fibre layer having a weight per unit area of approximately 500 g/m$^2$ and a glass fibre content of approximately 40 mass percent and a polypropylene content of approximately 60 mass percent as the thermoplastic binder, if the fibre layer is compressed to a thickness of approximately 0.4 millimeters a compacting which is complete (porosity of approximately zero) may be achieved (in the respective compacted regions}, if the compression is to 0.8 millimeters a porosity of approximately 50 percent may be achieved, if the compression is to 1.6 millimeters a porosity of approximately 75 percent may be achieved, and if the compression is to 3.2 millimeters a porosity of approximately 87.5 percent may be achieved.

The individual layers of the structural component are preferably firmly connected to one another, in particular being connected over connecting areas and/or being materially connected, such that they form a firmly cohesive structural component.

So that the fibres of the fibre material can be connected to one another and can cure in a desired three-dimensional shape without the structure of the fibres themselves undergoing too great a change, the fibre material preferably has a higher melting temperature or softening temperature than the thermoplastic binder.

According to a preferred further development, the fibre material comprises at least one of the following materials or is formed therefrom: glass fibres, mineral fibres, carbon fibres, polypropylene fibres, polyamide fibres, polyester fibres, polyethylene terephthalate fibres or a mixture thereof. The thermoplastic binder may for example comprise a polyolefin, preferably polypropylene.

Particularly preferably, there may be used as the fibre layer a combination of materials which is conventionally used as the core layer in a LWRT (lightweight reinforced thermoplastics) material that is known for motor vehicle coverings, such as the material known as Seeberlite, from Röchling Automotive. Instead of or in addition to the cover layers used to cover the core layers in the case of LWRT materials, with the structural component according to the invention the metal layers are used to cover the fibre layers (core layers) on both sides.

Aside from the low weight, a further advantage of the porosity of the fibre layers is seen in the fact that they have a sound-absorbing effect, with the result that additional sound absorption in the structural component according to the invention may be dispensed with.

So that the sound-absorbing properties of the porous fibre layers can be utilised better, it may be provided for at least one metal layer which lies closest to the outside in the stacking direction to be micro-perforated. Preferably, both the metal layers that lie closest to the outside in the stacking direction are micro-perforated in this way. Further, it may be provided for at least one metal layer, preferably the one that is in the middle as seen in the stacking direction, not to be micro-perforated, in order to ensure that the structural component is water-tight.

The term "micro-perforated" here is to be understood to mean that through holes having a hole diameter or, more generally, a slit width of less than 1 millimeters, preferably less than 0.2 millimeters, are provided in the metal layers at suitable spacings, wherein the hole diameter and the hole spacing are selected as a function of the layer thickness of the metal layer and/or the range of frequencies of the sound waves to be anticipated, in a manner suitable for achieving optimum sound absorption.

As regards the manufacturing costs, the complexity of manufacture and indeed later disposal of the structural component, it may be provided for a plurality and preferably all of the fibre layers to be identical in respect of their material composition, construction and/or thickness. The same may be provided for the metal layers, where appropriate with the exception of the micro-perforation mentioned above, which may be provided for only some of the metal layers.

The structural component according to the invention may in principle be a planar plate. Preferably, however, it is shaped to be three-dimensional, for example in order to increase the flexural rigidity of the component in particular directions, or to adapt the shape of the component to the surroundings (such as the bodywork of a motor vehicle) in which the component is to be used. For this purpose, and as will be described in more detail below, the stacked layers are compressed under pressure and where necessary under the action of heat, and given the desired three-dimensional shape.

In contrast to the domed shaping of the metal layers that is described below, in this case the term "three-dimensional shaping" of the structural component is understood in particular to mean a shaping which results in elevations and depressions in the structural component that have a height or an extent in the region of at least a centimeter, preferably several centimeters, and/or curves having a radius of curvature of at least a centimeter, preferably several centimeters.

Conventionally, the fibre layers can, on their own, be deformed more easily than the metal layers. For this reason, during the common compression and shaping of a plurality of metal and fibre layers that are stacked one above the other, it may happen that not all the layers are deformed to the same extent, with the result that the arrangement and thickness of the individual layers in the layer construction of the finished structural component becomes undesirably inhomogeneous.

In order to simplify shaping of the metal layers and hence to improve the structural component in respect of a homogeneous construction of the layers, it may be provided for at least one metal layer, preferably a plurality or all of the metal layers, to have a multi-domed shaping.

This is a structure impressed into the metal layers, which may for example take the form of an arrangement, alternating in the manner of a checkerboard, of approximately hemispherical elevations and depressions (domes}. In this case, the height and diameter of the domes is in each case a few millimeters. For example, a dome height of approximately 2.5-3 millimeters and a dome diameter of approximately 5 millimeters is possible.

As an alternative or in addition, in order to improve the homogeneity of the layer construction in a three-dimensionally shaped structural component, the metal layers may also be pre-shaped (preferably individually) without the fibre layers, to give a shape that corresponds or is similar to the desired three-dimensional shape of the structural component or which represents a preliminary shape thereof before they are compressed, together with the fibre layers, to produce the structural component.

It may be advantageous to provide further layers, in particular on the outer sides of the structural component, which are matched to the respective intended use of the component, in order to make the subsequent provision of outer and inner coverings superfluous and hence simplify assembly of the structural component.

For this purpose, it may be provided for the structural component to have on an outer side a layer of a porous material, for example a fibrous nonwoven or a foam mat, which is firmly connected to at least one of the other layers of the structural component, and/or for it to have on an outer side a metal layer, which where appropriate is painted, or a decorative layer which is also firmly connected to at least one of the other layers of the component. This connection may in particular be a material connection over connecting areas. The above-mentioned painted metal layer may also be (an outer) one of the at least three metal layers that are provided according to the invention.

For example, a nonwoven material that is resistant to stone chippings may be provided on one outer side, facing the road in the installed condition, of a structural component that is used as a floor component in a motor vehicle, and a carpet or a decorative layer may be provided on the outer side that faces the passenger compartment.

In order to improve adhesion of the layers to one another, it may be provided for the structural component to have, on at least one surface of one of the metal layers and/or fibre layers, an adhesion promoter, for example a sealing layer provided on one of the metal layers, which may be for example a thermoplastic material having a low melting point, or an epoxy resin. In addition or as an alternative, it is possible for the thermoplastic binder of the fibre layers to act as an adhesion promoter.

In order to further increase the strength and/or flexural rigidity of the structural component, or in order to provide it with other desired properties (such as fixing structures), it may be provided for the structural component to include at least one additional functional component, preferably a reinforcing profile, which is firmly connected to at least one of the layers of the structural component.

A functional component of this kind may for example be a hollow or flat profile, in particular a tubular profile.

For the firm connection to the layers, it may in particular be provided for the functional component to be arranged, at least in certain regions, between at least two layers of the structural component that are adjacent in the stacking direction, preferably between two metal layers, and to be connected to these. The connection may preferably be a material connection over connecting areas. In order to favour a connection of this kind, it may be provided for an adhesion promoter to be provided on the surface of the functional component. In particular, it is possible in this way to dispense with subsequent securing of the functional component (for example by welding to one of the metal layers).

In this case, it is equally possible for the functional component to be covered completely by the other layers of the structural component, and for sections of the surface of the functional component (in particular fixing structures) to be exposed within the structural component.

According to a further aspect, the present invention also relates to a method for manufacturing a structural component as described above, including the following steps: stacking the layers, wherein at least one metal layer having a thickness of at most 1 millimeters is arranged between two fibre layers which each include a fibre material and a thermoplastic binder; and compressing the stacked layers in a mould, to produce the structural component. A method of this kind is for example known from the printed specification mentioned at the outset.

In order to achieve the object of the invention of improving the method such that the weight of the structural component can be reduced or its flexural rigidity increased, according to the invention it is provided that during the step of stacking the layers at least three metal layers each having a thickness of at most 1 millimeters are arranged one above the other in the stacking direction such that each of the two fibre layers is arranged between two metal layers that are adjacent to one another in the stacking direction, wherein the fibre layers are selected such that after the step of compressing they each have, at least in certain regions, a porosity of at least 75%. The result is a multi-layered structure in which metal layers and porous fibre layers are arranged alternately.

During the step of compressing, the structural component may in particular be shaped to be three-dimensional.

Preferably, it is provided for at least one of the metal layers to be shaped to be three-dimensional before the step of stacking, in particular to be given a shape which corresponds to or is similar to the desired shape of the structural component.

Because the fibre layers are conventionally easier to deform than the metal layers, in this way, as explained in more detail above, the homogeneity of the resulting structural component may be improved even in the event of relatively pronounced desired deformations of the structural component.

As an alternative or in addition, it may be provided in order to simplify shaping of the stacked layers for multi-domed metal layers to be used.

Furthermore, it may be provided during or after the step of stacking for an additional functional component, for example a reinforcing profile, to be arranged at least in certain regions between two layers of the stack and for the functional component to be compressed and where appropriate shaped together with the layers, to produce the structural component.

As described above in connection with the component, it may be provided before and/or during the step of compressing for at least one of the fibre layers, preferably for the entire stack of layers, to be heated, preferably to a temperature higher than the melting temperature or softening temperature of the thermoplastic binder but lower than the melting temperature or softening temperature of the fibre material. Here, the thermoplastic binder may also serve to connect directly adjacent layers, preferably over connecting areas.

In the case of fibre materials in which the thermoplastic binder is also originally in fibre form, the fibre layer tends to shrink drastically during the first heating procedure, during which the low-melting fibres of the thermoplastic binder melt and flow around the fibres of the higher-melting fibre material. To prevent this, it may be provided for at least the fibre layers to be fixed along their peripheral rims during the heating procedure.

In order to obtain a structural component which is optimally matched to the respective intended use, it may further be provided during the step of stacking for a cover layer, preferably a cover nonwoven or a decorative foil, to be arranged on at least one and preferably both outer sides of the stack and to be compressed together with the other layers of the stack, to produce the structural component. It is possible in particular in this way to dispense with providing the structural component subsequently with outer cover layers. However, it is also possible for example to paint an exposed metal layer of the structural component subsequently or to process it in another way.

The present invention will be explained in more detail with reference to some preferred exemplary embodiments. In this connection:

FIG. 1 shows a cross sectional view of a detail of a first exemplary embodiment of the present invention, FIG. 2 shows a cross sectional view of a detail of a second exemplary embodiment of the present invention, and FIG. 3 shows a cross sectional view of a detail of a third exemplary embodiment of the present invention.

All the figures are highly schematic and simplified drawings which merely serve to illustrate the principle of the invention and in particular should not be understood as being to scale. Furthermore, the figures each show only small details of the respective structural component.

Features of the second and third exemplary embodiments that correspond to those of the first exemplary embodiment are provided with reference numerals which result from adding 100 or 200, respectively, to those of the first exemplary embodiment. Where letters are used, the same reference is used in all exemplary embodiments for mutually corresponding features. The second and third exemplary embodiments are only described where they differ from the first exemplary embodiment; otherwise, the reader is referred to the description of the latter.

FIG. 1 shows a structural component 10 according to a first exemplary embodiment of the invention. This structural component 10 comprises three metal layers 12 which are arranged one above the other in a stacking direction S and in the present case take the form of metal sheets or metal foils, for example of aluminium, having a thickness of at most 1 millimeters. The structural component further comprises two fibre layers 14 which respectively comprise a fibre material (e.g. glass fibres) and a thermoplastic binder (e.g. polypropylene) and are arranged to alternate with the metal layers 12, with the result that each of the two fibre layers 14 is arranged between two metal layers 12 that are adjacent to one another in the stacking direction S.

The metal layers may for example have a weight per unit area of 500 g/m$^2$ and the fibre layers a weight per unit area of approximately 1 000 g/m$^2$, wherein the fibre layers may comprise 40 mass percent of glass fibres and 60 mass percent of polypropylene (as the thermoplastic binder).

A cover layer 18 may be provided on an outer side of the structural component 10 according to the invention, and this may be for example a layer of paint or a carpet or a decorative nonwoven, in the present case having a weight per unit area of approximately 500 g/m$^2$. This side may for example face a passenger compartment if the structural component 10 illustrated is used as a floor component in a motor vehicle.

On another outer side of the structural component, a further cover layer 16, for example in the form of a porous material such as a nonwoven material, may be provided, wherein the cover nonwoven 18 illustrated, which is resistant to stone chippings, may in the present case comprise for example 25 mass percent of glass fibres and 75 mass percent of polypropylene and at the same time have a weight per unit area of approximately 500 g/m$^2$, with the result that the structural component 10 has a weight per unit area of approximately 4.5 kg/m$^2$ overall.

In FIG. 1, as in the other exemplary embodiments (though not illustrated there), at least the two outer metal layers 12, as seen in the stacking direction, may have a micro-perforation 13, with the result that sound waves may penetrate into the inner fibre layers 14 and be absorbed there.

The structural component 10 illustrated in FIG. 1 is adapted for use as a floor component or floor pan of a motor vehicle. It may completely replace a conventional floor component, which is usually made from an individual solid metal plate on which various material layers are subsequently provided for sound absorption or noise reduction and for generating resistance to stone chippings and for purposes of decoration or comfort, and which has a weight per unit area, including these additional layers, of approximately 10 kg/m$^2$. By comparison with a conventional floor component of this kind, having a solid metal plate, a weight saving of more than 50% may be achieved using the structural component according to the invention, in which the functional layers for sound absorption, etc. are already integrated.

In the structural component 110 illustrated in FIG. 2, the metal layers 112 are each provided with a multi-domed impression in order to simplify a three-dimensional shaping (not illustrated) of the structural component (such as the formation of a trough-like depression or an upwardly extended rim in the structural component). This is particularly useful in the case of a particularly large number of metal layers or a particularly pronounced desired three-dimensional shaping of the multi-layered structural component.

Here, the multi-domed shaping comprises a pattern, impressed into the metal layers, of elevations 112.1 and depressions 112.2 which resemble hemispheres and are arranged alternately in the manner of a checkerboard, wherein the individual domes (spherical portions) in the present example have a dome diameter D of approximately 5 millimeters and a dome height H of approximately 2.5 millimeters, and thus lie in the region of a few millimeters.

During manufacture, the multi-dome-shaped metal layers 112 may be stacked with the fibre layers 114 and then compressed and where appropriate shaped, with the multi-domed shaping simplifying the shaping of the metal layers (with radii of curvature or dimensions of the structures produced by the shaping in the region of several centimeters) and hence improving the homogeneity of the layered structure in the structural component 110.

In contrast to the illustration in FIG. 2, it is possible here for the multi-domed shaping of the metal layers 112 not to be made in the cover layers 116, 118, and for the respectively outer surfaces of the cover layers 116, 118 to be planar, unlike the situation illustrated.

As illustrated in FIG. 3, it is also possible to integrate in a structural component 210 according to the invention further components, such as a functional component 220, which in the present case takes the form of a hollow profile and serves as a reinforcing component. During manufacture, two stacks, each comprising three metal layers 212, two fibre layers 214 and a cover layer 216 and 218 respectively, are arranged in mirror symmetry to one another, one above and one below the functional component 220 as seen in the stacking direction S, and are compressed with the latter to produce the structural component 210.

Additional functional components of this kind may on the one hand affect the strength, flexural rigidity, etc. of the structural component in a desirable manner, but may also serve other functions such as providing fixing structures for attaching the structural component to further components, for example of a motor vehicle.

In all the exemplary embodiments, an adhesion promoter may be provided in each case between directly adjacent layers and on the surface of the functional component 220 in order to enable or simplify a form-fitting connection over connecting areas between the layers, or between the layers and the functional component.

Structural components according to the invention may be used not only in the motor vehicle sector, for example as floor components (to replace conventional floor pans), frame or bodywork components, but also for example in plasterboard construction.

The invention claimed is:

1. A method for manufacturing a multi-layered structural component comprising the following steps:
   stacking the layers, wherein at least one metal layer in the form of a metal foil having a thickness (d) of at most 1 millimeters is arranged between two fibre layers which each include a fibre material and a thermoplastic binder, and
   compressing the stacked layers in a mould, to produce the structural component, wherein during the step of stacking the layers at least three metal layers in the form of metal foils each having a thickness (d) of at most 1 millimeters are arranged one above the other in the stacking direction (S) such that each of the two fibre layers is arranged between two metal layers that are adjacent to one another in the stacking direction (S), wherein the fibre layers are selected such that after the step of compressing they have, at least in certain regions, a porosity of at least 75%.

2. A method according to claim 1, wherein before the step of stacking at least one of the metal layers is shaped to be three-dimensional.

3. A method according to claim 1, wherein during or after the step of stacking an additional functional component is arranged at least in certain regions between two layers of the stack, and in that the functional component is compressed together with the layers, to produce the structural component.

4. A method according to claim 1, wherein before and/or during the step of compressing at least one of the fibre layers is heated, to a temperature higher than the melting temperature or softening temperature of the thermoplastic binder but lower than the melting temperature or softening temperature of the fibre material of the fibre layer.

5. A method according to claim 4, wherein the fibre layers are fixed along their peripheral rims during the heating procedure so that the fibre layers are prevented from shrinking while being heated.

6. A method according to claim 1, wherein during the step of stacking, a cover layer is arranged on at least one outer side of the stack and is compressed together with the other layers of the stack, to produce the structural component.

7. A method according to claim 4, wherein the thermoplastic binder in the at least one fibre layer originally is in the form of fibres, which binder material fibres are molten while the at least one fibre layer is heated.

8. A method according to claim 1, wherein at least one metal layer which lies closest to the outside in the stacking direction (S) is or are micro-perforated.

9. A method according to claim 1, wherein at least one metal layer has a multi-domed shaping.

10. A method according to claim 1, wherein both metal layers, which lie closest to the outside in the stacking direction (S) are micro-perforated.

11. A method according to claim 1, wherein a plurality of the metal layers have a multi-domed shaping.

12. A method according to claim 1, wherein one metal layer which lies closest to the outside in the stacking direction (S) is micro-perforated.

13. A method according to claim 1, wherein all of the metal layers have a multi-domed shaping.

* * * * *